Oct. 27, 1925. 1,558,865
M. GREENMAN
COMBINATION BRAKE AND NONSKID DEVICE FOR VEHICLES
Original Filed March 9, 1923
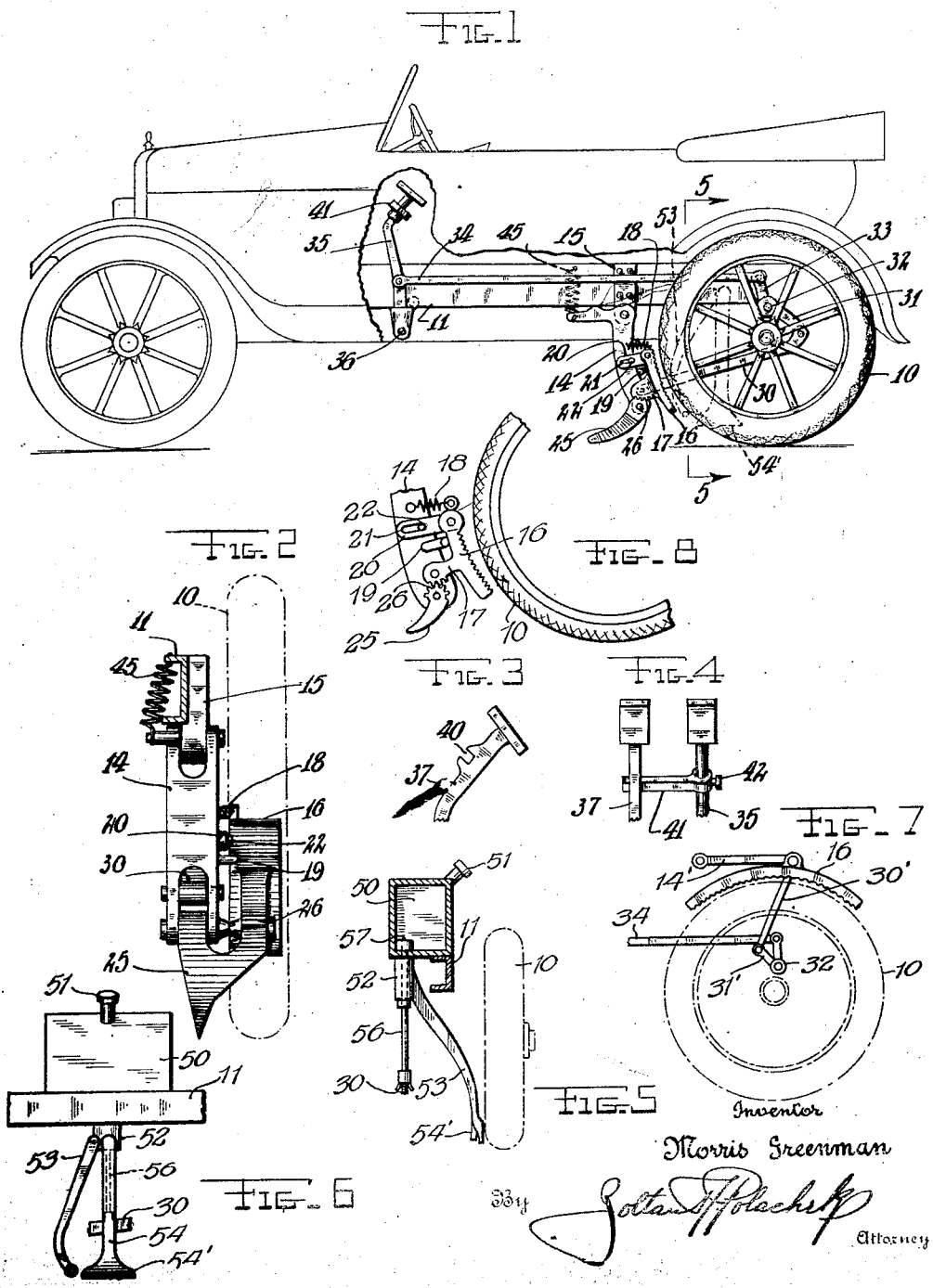
Inventor
Morris Greenman Patented Oct. 27, 1925.

1,558,865

UNITED STATES PATENT OFFICE.

MORRIS GREENMAN, OF NEW YORK, N. Y.

COMBINATION BRAKE AND NONSKID DEVICE FOR VEHICLES.

Application filed March 9, 1923, Serial No. 623,984. Renewed September 10, 1925.

*To all whom it may concern:*

Be it known that I, MORRIS GREENMAN, a citizen of the United States, residing at New York, in the county of New York and State of New York, have invented certain new and useful Improvements in Combination Brake and Nonskid Devices for Vehicles, of which the following is a specification.

This invention relates to a combination brake and non-skid device for automobiles the invention having for a general object to provide an emergency braking and skid preventing device for automobiles which acts as a single unit, a further object relating to the provision of means for detachably connecting said device with the ordinary brake pedal so as to be operated by the latter, or not, as may be desired.

For further comprehension of the invention, and of the objects and advantages thereof, reference will be had to the following description and accompanying drawings, and to the appended claims in which the various novel features of the invention are more particularly set forth.

Fig. 1 of the drawings is a fragmentary side view of an automobile having the invention applied thereto.

Fig. 2 is a detail transverse elevation of the braking and non-skid device.

Fig. 3 is a fragmentary side view of the usual brake pedal showing it provided with means for connection to the novel emergency device.

Fig. 4 is a face view showing the ordinary brake pedal and the pedal of the emergency device arranged to operate together.

Fig. 5 is a detail transverse vertical sectional view on the line 5—5 of Fig. 1.

Fig. 6 is a side elevation of the parts illustrated in Fig. 5.

Fig. 7 is a diagrammatic side view illustrating a different positioning of the emergency brake.

Fig. 8 is an enlarged fragmentary side view of the braking and non-skid device.

In the drawing the reference numeral 10 indicates one of the rear wheels of an automobile and 11 one of the main side frame members of the chassis. It will be understood, of course that one of these devices will be applied on each side of the automobile, therefore we will only describe one in detail. Depending from the frame member 11 is an arm 14 which may be pivotally attached to an ear 15 on the said frame member.

This arm supports a brake shoe 16 whose rear face is curved concentric to the wheel 10 and may be roughened as shown, the shoe having a forwardly projecting lug 17 formed thereon midway between its ends which is pivotally attached to the arm. The shoe 16 is normally held against swinging movement on the arm 14 by means of a tension spring 18 which is connected to both arm and shoe and holds the latter bearing on a stop 19 on the arm. Swinging movement of the shoe on the arm is positively limited by means of a link 20 pivotally attached at one end to the shoe and having a longitudinal slot 21 in its opposite end into which projects a pin 22 on the arm 14. In the normal position of the shoe, bearing on the stop 19, it is eccentric with respect to the wheel 10, its lower end being nearer the wheel than the upper end.

The shoe 16 is connected to the arm 14 a short distance above the lower end on the latter, which has pivoted to its lower end a member 25 which is adapted to be engaged with the ground to prevent side slipping or skidding being automatically moved to operative position as the shoe 16 is moved to engage the wheel 10, the hub of member 25 and the lug 17 having meshing gear segments, indicated at 26, formed thereon whereby this is accomplished, in a manner to be presently pointed out. As indicated in Fig. 2 the arm 14 and member 25 are of a construction and arrangement to be securely braced against side strain.

To move the shoe 16 into engagement with the wheel 10 a link 30 is attached at one end to the arm 14 and extends rearwardly under the rear axle and is connected at its other end to an arm 31 fixed on a transverse rockshaft 32 suitably supported by the usual housing of the rear axle. It will be understood of course that there will be a pair of these levers 31 connected to the shaft 32, by the rocking of which latter the devices on both sides of the automobile are operated. Fixed also to the shaft 32 is an arm 33 to which is connected a forwardly extended link 34 whose forward end is connected to a pedal member 35 pivotally mounted as indicated at 36 on any suitable part of the automobile frame. The pedal member 35 extends up through the dash board of the automobile similarly to the pedal 37 for the ordinary service brake, and beside the said pedal 37 as indicated in Fig. 4.

To enable the emergency device to be operated from the pedal 37 to the latter is formed to present a notch 40 in which may be engaged an arm 41 secured by a set screw to the pedal member 35, and which arm, as will be apparent, may be readily moved into or out of the said notch as may be desired.

In the operation of my improved device, when the desired pedal member is depressed, shaft 32 is rocked, causing both brake shoes to be moved into engagement with the respective wheels. By reason of the normal eccentric arrangement of the shoe 16 with respect to the wheel its lower end first engages the wheel; a swinging movement of the shoe on the arm 14 resulting as the shoe moves into complete engagement with the wheel, thereby causing the member 25 for preventing side slip to be swung downward to engage the ground. The parts may be returned to normal position when released a spring 45 connected to a finger on the upper end of arm 14.

I also preferably provide a means for distributing sand upon the roadway adjacent the rear wheels. This means comprises for each wheel a box 50 set into the body and adapted to be filled with a sand through a suitable filling opening closed by a cap 51. Extending downwardly from this box is a short and relatively large pipe 52 which is branched at its lower end into a pair of smaller pipes 53 and 54 which lead downward to points adjacent the wheel, the pipe 53 being adapted to direct the sand in front of the wheel, while the pipe 54 is arranged to direct the sand beside the wheel, the latter pipe being flattened at its lower end as at 54'. Extending longitudinally through the pipe 52 is a valve stem 56 having on its upper end a valve 57 which normally closes the top of said pipe. The upper end of this stem may be guided in any suitable spider element in the top of the pipe 52, and its lower end extends downwardly through a suitable guide aperture in the closed lower end of the said pipe and is located above the link 30 and the valve stem is lifted by the said link to open valve 57 when the emergency brake is operated. The link 30 may be given any suitable curvature between its ends to bring it under the said stem.

In Fig. 7 I have illustrated a different position of the brake shoe 16' and supporting arm 14' which are here shown as above the wheel, the connecting link 30' and arm 31' on shaft 32 being suitably arranged for this different position.

Having thus described my invention what I claim as new and desire to protect by Letters Patent of the United States is as follows:

1. An emergency brake and non-skid device for automobiles comprising a shoe adapted to engage a wheel of the automobile, an arm on which said shoe is mounted, means for swinging said arm to bring the said shoe into operative engagement with the wheel, a member carried by said arm and adapted to engage the ground, and means whereby said member is caused to engage the ground as the shoe engages the wheel, said last means including meshing gear segments on said member and brake shoe.

2. An emergency brake and non-skid device for automobiles comprising a shoe adapted to engage a wheel of the automobile, a swingable arm on which said shoe is mounted, means for swinging said arm to bring said shoe into engagement with the wheel, spring and stop elements normally holding said shoe from swinging on said arm, pin and slotted link means for limiting movement of said shoe on said arm, said shoe being adapted to swing on said arm as the shoe engages the said wheel, and a device adapted to be moved to engage the ground to prevent side slip as the shoe swings on the said arm.

3. An emergency brake and non-skid device for automobiles comprising a shoe adapted to engage a wheel of the automobile, a swingable arm on which said shoe is mounted, means for swinging said arm to bring said shoe into engagement with the wheel, spring and stop elements normally holding said shoe from swinging on said arm, pin and slotted link means for limiting movement of said shoe on said arm, said shoe being adapted to swing on said arm as the shoe engages the said wheel, and a device adapted to be moved to engage the ground to prevent side slip as the shoe swings on the said arm, and meshing gear segments on said device and shoe whereby the former is caused to so move.

4. In an automobile, a brake shoe adapted to engage the wheel thereof, a non-skid member adapted to engage the ground, a sand delivery device, and a common operating means for all of the said parts.

In testimony whereof I have affixed my signature.

MORRIS GREENMAN.